United States Patent
Ying et al.

(10) Patent No.: US 9,816,508 B2
(45) Date of Patent: Nov. 14, 2017

(54) DRY-TYPE CABLE WIRE OUTLET DEVICE FOR A SUBMERSIBLE ELECTRICAL PUMP

(71) Applicant: NINGBO JUSHEN PUMPS INDUSTRY CO., LTD., Zhejiang (CN)

(72) Inventors: Jianguo Ying, Zhejiang (CN); Songmao Zhai, Zhejiang (CN); Quanmin Li, Zhejiang (CN)

(73) Assignee: NINGBO JUSHEN PUMPS INDUSTRY CO., LTD., Ningbo (CN)

( * ) Notice: Subject to any disclaimer, the term of this patent is extended or adjusted under 35 U.S.C. 154(b) by 337 days.

(21) Appl. No.: 13/786,648

(22) Filed: Mar. 6, 2013

(65) Prior Publication Data

US 2013/0177458 A1    Jul. 11, 2013

Related U.S. Application Data

(63) Continuation of application No. PCT/CN2011/079331, filed on Sep. 5, 2011.

(30) Foreign Application Priority Data

Sep. 7, 2010    (CN) .......................... 2010 1 0278428

(51) Int. Cl.
| | |
|---|---|
| F04D 13/06 | (2006.01) |
| F04D 13/08 | (2006.01) |
| H02G 3/22 | (2006.01) |
| H02G 15/013 | (2006.01) |
| H02G 3/06 | (2006.01) |
| H02G 15/007 | (2006.01) |

(52) U.S. Cl.
CPC ....... *F04D 13/0693* (2013.01); *F04D 13/086* (2013.01); *H02G 3/22* (2013.01); *H02G 15/013* (2013.01); *H02G 3/0683* (2013.01); *H02G 15/007* (2013.01)

(58) Field of Classification Search
CPC .... F04D 13/08; F04D 13/086; F04D 13/0693; F04D 29/007; F04D 29/406; F04D 49/40; F04B 47/06; H02G 9/06; E21B 43/128; E21B 43/129; E21B 43/0407
USPC .................... 417/422, 423.3, 423.14; 310/87
See application file for complete search history.

(56) References Cited

U.S. PATENT DOCUMENTS

| | | | | |
|---|---|---|---|---|
| 2,986,308 | A | * | 5/1961 | Pacey et al. ................... 222/333 |
| 3,746,472 | A | * | 7/1973 | Rupp ................................. 417/9 |

(Continued)

*Primary Examiner* — Devon Kramer
*Assistant Examiner* — Kenneth J Hansen
(74) *Attorney, Agent, or Firm* — Gokalp Bayramoglu

(57) ABSTRACT

A dry-type cable wire outlet device for a submersible electrical pump includes a wire outlet box positioned in a wellbore, a cable protection pipe, a wire outlet sealing device and a cable. The wire outlet box is connected to the top of a submersible electrical pump. One end of the cable protection pipe is connected to the top of the wire outlet box, and the other end extends out of the well cover of the wellbore. The cable is positioned in the cable protect pipe and connected with the submersible electrical pump through the wire outlet box. The wire outlet sealing device is connected to the well cover, and an end of the cable protection pipe extending outside the well cover is positioned in the wire outlet sealing device. When the device is in use, the opening at the top end of the cable protection pipe is no longer exposed.

5 Claims, 5 Drawing Sheets

(56) References Cited

U.S. PATENT DOCUMENTS

| | | | | |
|---|---|---|---|---|
| 3,853,182 A | * | 12/1974 | Bourne, Jr. | E21B 4/20 |
| | | | | 173/33 |
| 4,708,201 A | * | 11/1987 | Reed | H01R 13/523 |
| | | | | 166/65.1 |
| 5,070,940 A | * | 12/1991 | Conner et al. | 166/65.1 |
| 5,918,268 A | * | 6/1999 | Lukas et al. | 73/40.5 R |
| 2006/0151179 A1 | * | 7/2006 | Boyadjieff | E21B 17/003 |
| | | | | 166/380 |
| 2007/0170407 A1 | * | 7/2007 | Ruan | 254/108 |

* cited by examiner

DRY-TYPE CABLE WIRE OUTLET DEVICE FOR A SUBMERSIBLE ELECTRICAL PUMP

RELATED APPLICATIONS

The present application is a continuation of International Application Number PCT/CN2011/079331, filed Sep. 5, 2011, and claims priority from Chinese Application Number 201010278428.4, filed Sep. 7, 2010, the disclosure of which is hereby incorporated by reference herein in its entirety.

FIELD OF THE UTILITY MODEL

The present utility model relates to the field of the hydraulic machinery, especially to a dry-type cable wire outlet device of a submersible electrical pump.

BACKGROUND OF THE UTILITY MODEL

Presently, the submersible electrical pump is widely utilized increasingly, which is the type of the water pump in which all of the pump body, the impeller and the motor driving the impeller are submerged in water when running. Because the submersible electrical pump is working underwater in a water well while the submersible electrical pump is connected with the control box in control room by means of a cable, a wire outlet device is generally provided outside of the cable, so that it ensures that the cable is not washed by water flow pumped by the submersible electrical pump in work. The wire outlet device in the prior art includes an outlet box, a cable protection pipe and an anti-lift platen, the outlet box is fixedly connected to the top of the submersible electrical pump, a well cover is provided on the top of the water well, and one end of the cable protection pipe is connected to the top of the outlet box while the other end is extended outside the well cover and position stopped by means of the Anti-lift platen.

However, such a cable wire outlet device of the submersible electrical pump in the prior art has some disadvantages as follow:
1) The cable protection pipe is used to protect the cable from being washed by water flow pumped by the water pump, but in practice the pump station with several submersible electrical pump do not need the pump room, that is to say, it is outdoor, so that the rain will easily enter into the cable protection pipe from the opening at the upper end of the cable protection pipe when raining, and thus the cable in the cable protection pipe is easily positioned in the moist environment, which brings in great potential safe hazard for running the submersible electrical pump;
2) There is no drain hole at the lower end of the cable protection pipe, so that the rainwater leaked out in the cable protection pipe could not be drained, thus causing the cable to soak in the water for a long time and bringing in the great potential safety hazard to the running of the submersible electrical pump.
3) Meanwhile, there is no leaking alarm device provided in the cable protection pipe, so that it is difficult to discover whether water flows into the cable protection pipe, thus the potential safe hazard is difficult to be discovered and excluded in time by the operator over the ground.
4) In addition, some wellbores of the submersible electrical pump are very deep, even deep to nearly 30 meters, so that the cable and the cable protection pipe of the submersible electrical pump need to be very long. Although the cable protection pipe generally made of the steel circular pipe could be divided into several segments laterally, those segments of the cable protection pipe are connected with the submersible electrical pump through the cable, which brings in the great inconvenience of assembling, repairing, and disassembling the submersible electrical pump.

SUMMARY OF THE UTILITY MODEL

The technical problems being solved by the present utility model is to provide a dry-type cable wire outlet device of a submersible electrical pump with so great seal ability that the safe operation of the submersible electrical pump is ensured. For solving the aforesaid technical problems, the dry-type cable wire outlet device of an submersible electrical pump according to the present utility model includes a wire outlet box positioned in a wellbore, a cable protection pipe and a cable, said wire outlet box is connected to the top of the submersible electrical pump, one end of said cable protection pipe is connected to the top of the wire outlet box, and the other end is extended outside the well cover of the wellbore, said cable is positioned within the cable protection pipe and connected with the submersible electrical pump through the wire outlet box, and the cable wire outlet device further includes a wire outlet sealing device connected to the well cover, and the end of the cable protection pipe which is extended outside the well cover is positioned within the wire outlet sealing device.

Said wire outlet sealing device includes a sealing box and a sealing assembly of the wire outlet hole, and said sealing box is connected to the well cover with a sealing ring therein; said cable passing through the connection of the sealing box is sealed by means of the sealing assembly of the wire outlet hole.

Said sealing assembly of the wire outlet hole includes a cable sealing ring, a rubber sleeve and a bell mouth with an axial through groove, said cable sealing ring is embedded in the cable wire outlet hole of the sealing box, said rubber sleeve surrounds the cable, said bell mouth surrounds the rubber sleeve and is fastened by means of an anchor ear and a bolt, and an end of the bell mouth is tightly pressing against the cable sealing ring.

A sealing washer and a sealing platen is provided within said wire outlet sealing device, and said sealing washer is tightly fitted in with the cable protection pipe and fixed on the well cover by means of the sealing platen.

An anti-lift block is provided on said scaling platen by means of the bolt.

The opening of said cable protection pipe, which is positioned in the wire outlet sealing device, is muff-coupled with an anti-chafe jacket.

Said cable protection pipe is in Harvard-typed structure and connected by screws.

A drain hole is provided on the side wall at the bottom of said wire outlet box, and a plug is screwed at said drain hole.

A water-leakage alarm is provided within said wire outlet box and fixed on the top of the submersible electrical pump.

As compared to the prior art, the present utility model with such construction has several advantages as follow:
1) Because a wire sealing device is assembled on the well cover, the opening at the top end of the cable protection pipe is no longer exposed outside, so that the rainwater avoids entering into the cable protection pipe and the cable is kept in the dry environment all the time. Therefore the cable is kept in a dry environment all the time; the device also prevents water flow pumped by the submersible electrical pump from washing on to the cable and prevents rainwater from wetting the cable, thus ensuring the normal, reliable and safe operation of the submersible electrical pump.

2) A sealing assembly of the wire outlet hole is positioned at the place where the cable comes out of the wire outlet sealing device, thus ensuring the seal ability of the wire outlet sealing device.

3) When the submersible electrical pump is working, the water in the well will be driven upward, which maybe rushes into the place above the cable protection pipe and falls into the cable protection pipe, and thus the sealing washer is tightly fitted in at the top of the cable protection pipe and tightly pressed by means of the sealing platen, which prevents the water in the well from rushing into the cable protection pipe, and ensures the safe operation of the submersible electrical pump.

4) Meanwhile, because of a reverse inertia force of the impeller which is generated when stopping the submersible electrical pump, which may cause the water in the well to form an impact force of the recharging which may raise the whole submersible electrical pump and the corresponding connecting pieces. For avoiding this situation, an anti-lift block is provided above the sealing platen so that it prevents the submersible electrical pump from rising.

5) In addition, a drain hole and a plug are provided on the side wall at the bottom of the wire outlet box. Even if water is leaked into the wire outlet box and stored therein, water in the wire outlet box could be discharged in time by means of opening the plug when stopping the submersible electrical pump, thus decreasing the effect to the usability of the submersible electrical pump.

6) In addition, a water-leakage alarm is assembled within the wire outlet box. The audio-visual alarm will alert the control box of the submersible electrical pump in the control room once water enters into the wire outlet box via the cable protection pipe. Then the administrator in the control room could find that water has entered into the cable protection pipe in time and perform the next operation.

7) The cable protection pipe is designed in the Harvard-typed structure, so that the process of the cable passing through the segments of cable protection pipe is omitted, and thus the assembly and disassembling is more convenience and the work efficiency is greatly increased.

8) An anti-chafe jacket is muff-coupled at the opening of the cable protection pipe, so that the cable may softly contact with the cable protection pipe made of steel, the friction between the cable and the cable protection pipe is decreased, and the service life of the cable is prolonged.

Wherein: 1. the well cover; 2. the wellbore; 3. the cable protection pipe; 4. the cable; 5. the wire outlet box; 6. the water-leakage alarm; 7. the submersible electrical pump; 8. the drain hole; 9. the plug; 10. the sealing ring; 11. the sealing box; 12. the sealing assembly of the wire outlet hole; 121. the cable sealing ring; 122. the rubber sleeve; 123. the bell mouth; 13. the cable wire outlet hole; 14. the anti-lift block; 15. the bolt; 16. the sealing platen; 17. the sealing washer; 18. the anti-chafe jacket.

DETAILED DESCRIPTION OF THE UTILITY MODEL

The present utility model will be further explained by means of the preferred embodiment with reference to the attached figures.

Figure 1:
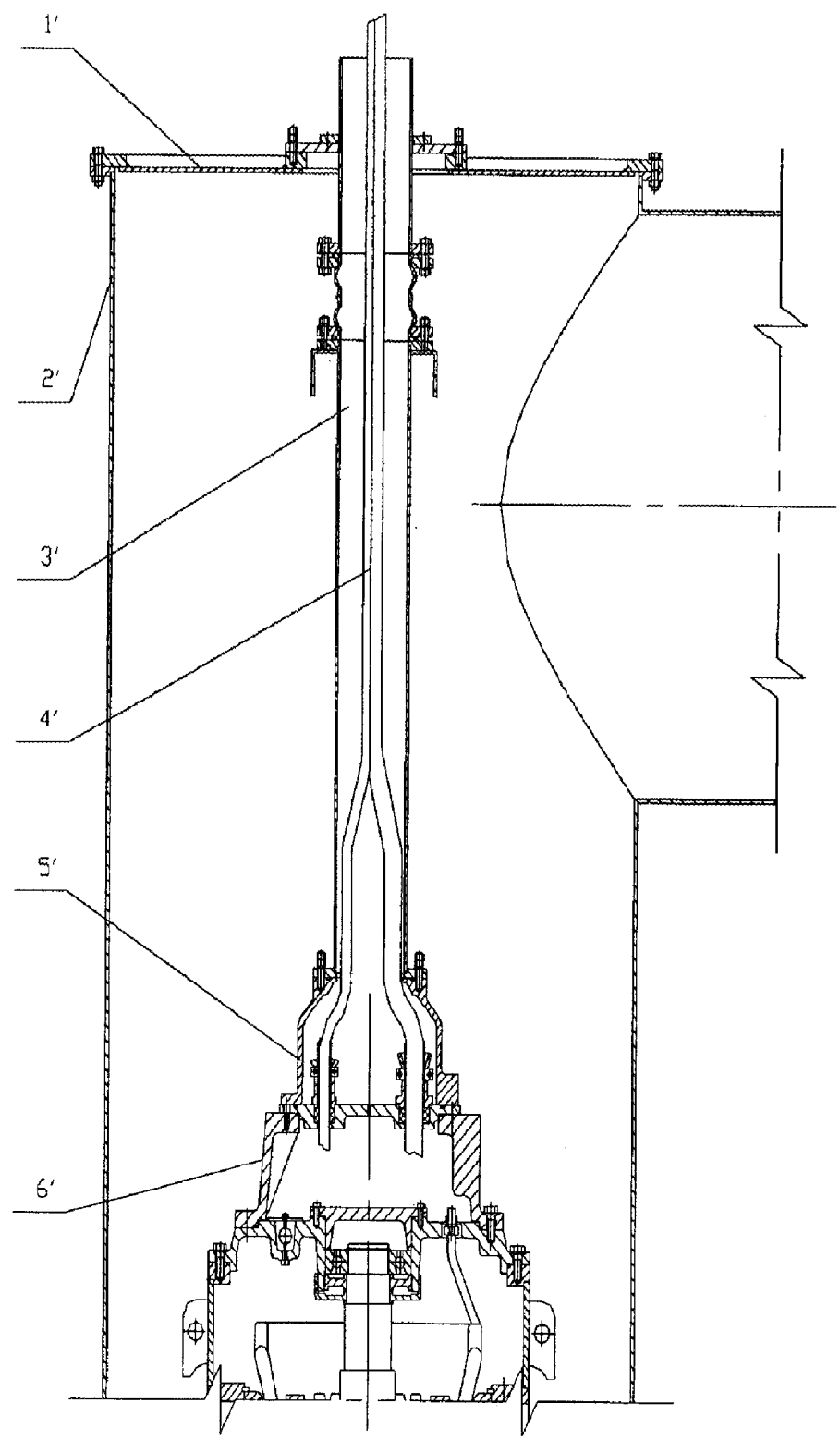
FIG. 1 is the structural representation view of a cable wire outlet device of an submersible electrical pump in the prior art.
Figure 2:
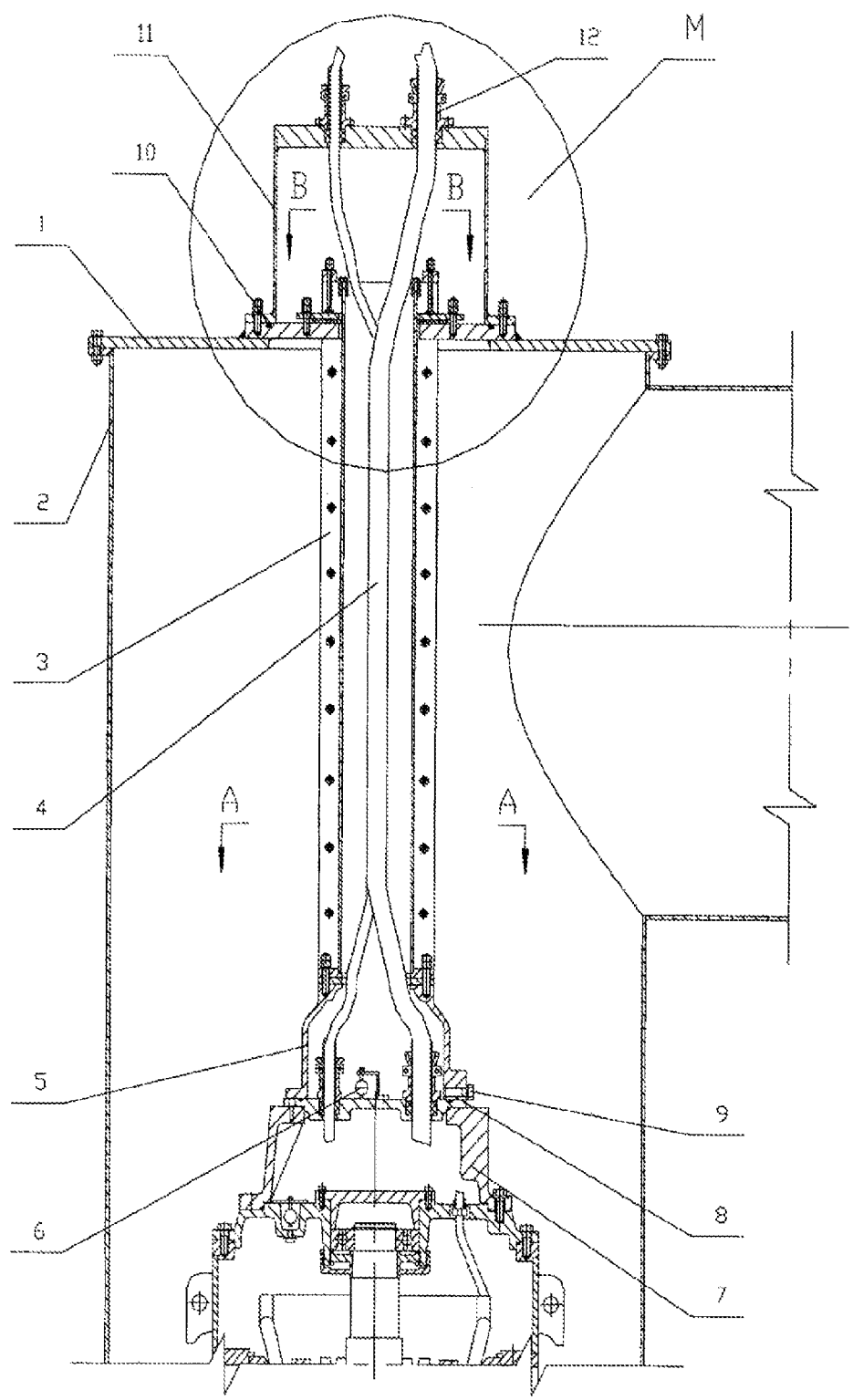
FIG. 2 is a structural representation view of the dry-type cable wire outlet device of the submersible electrical pump according to the present utility model.
Figure 3:
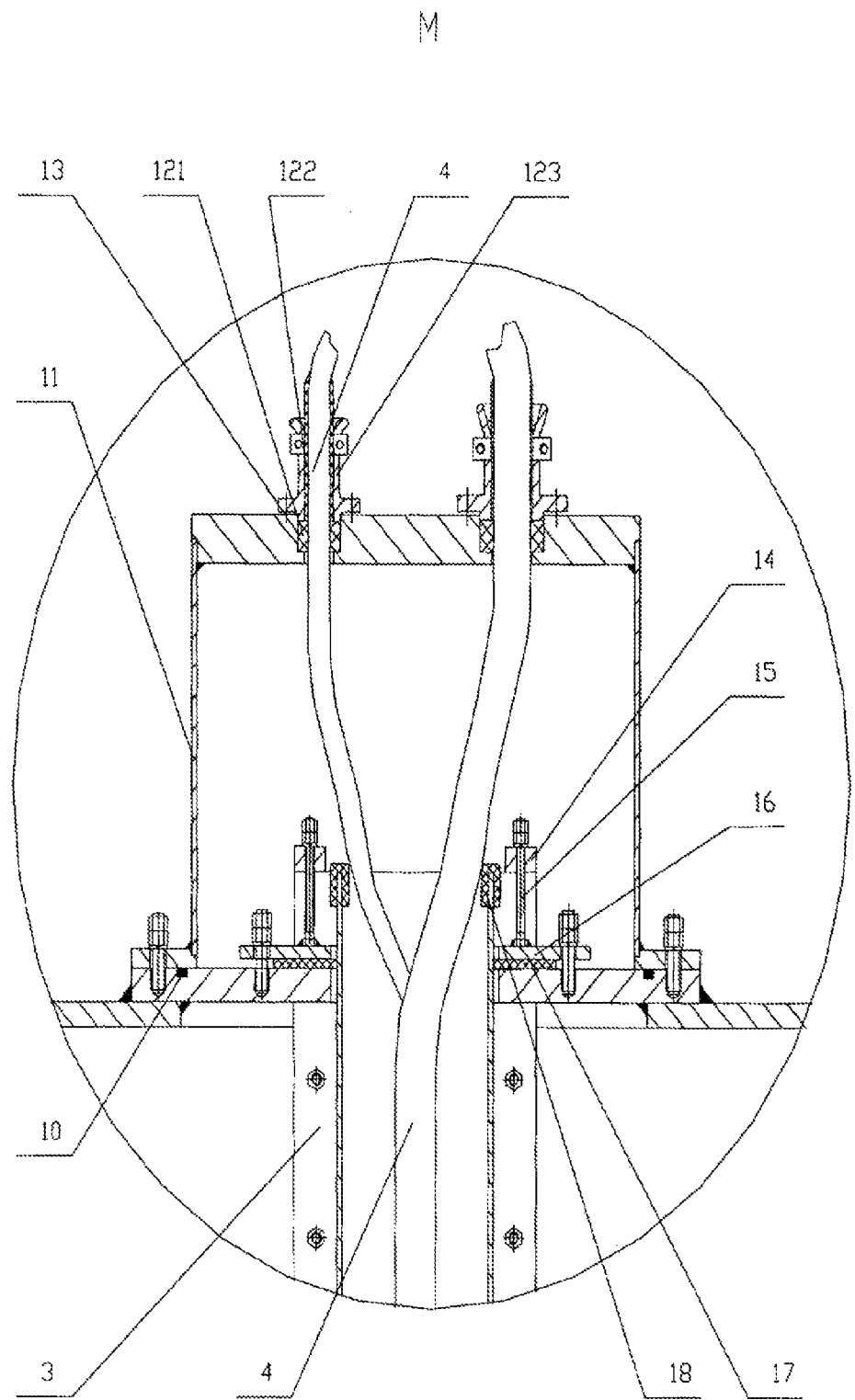
FIG. 3 is a partially enlarged structural representation view of the portion M in FIG. 2.
Figure 4:
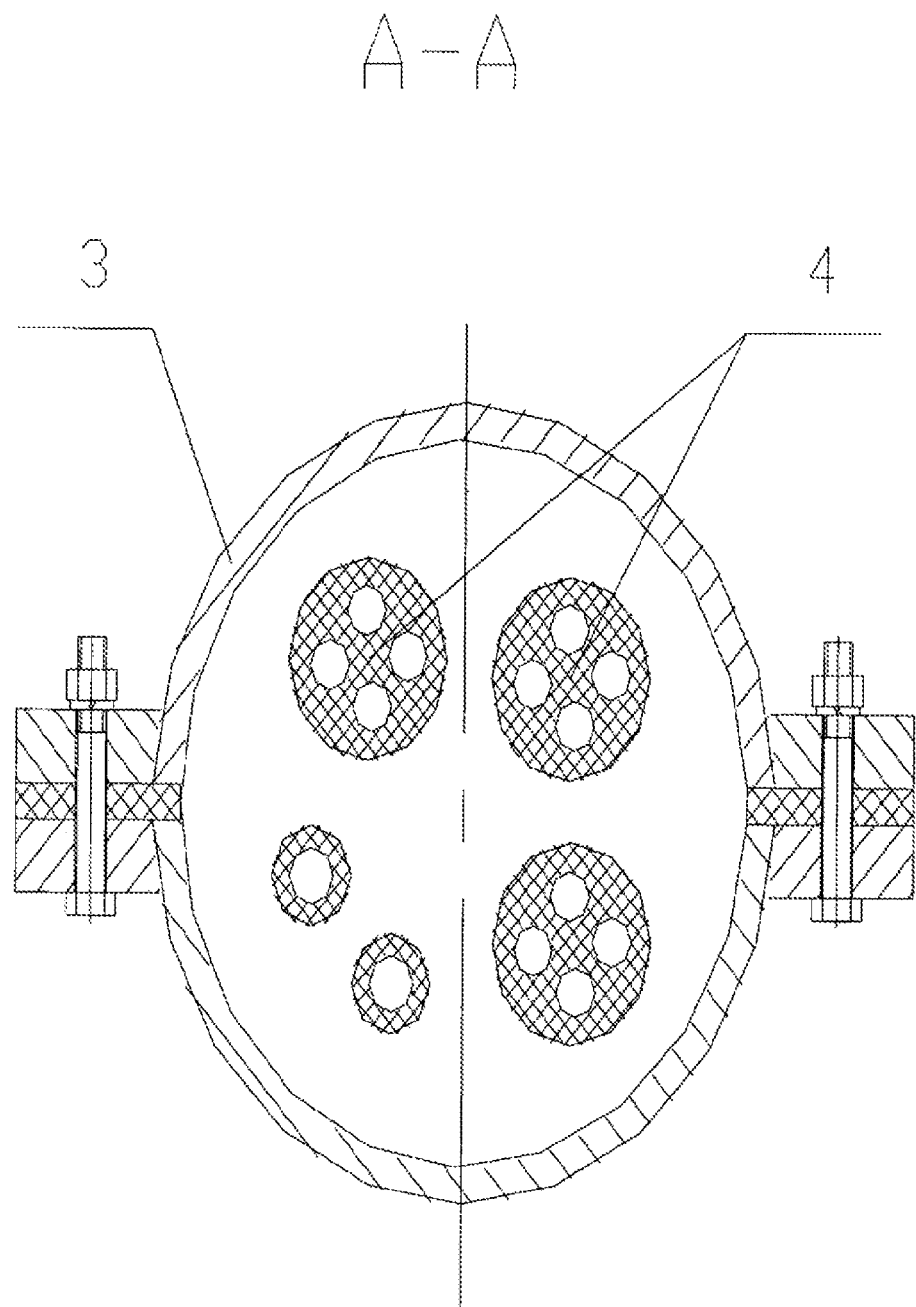
FIG. 4 is the section structural representation view along the direction A-A in FIG. 2.
Figure 5:
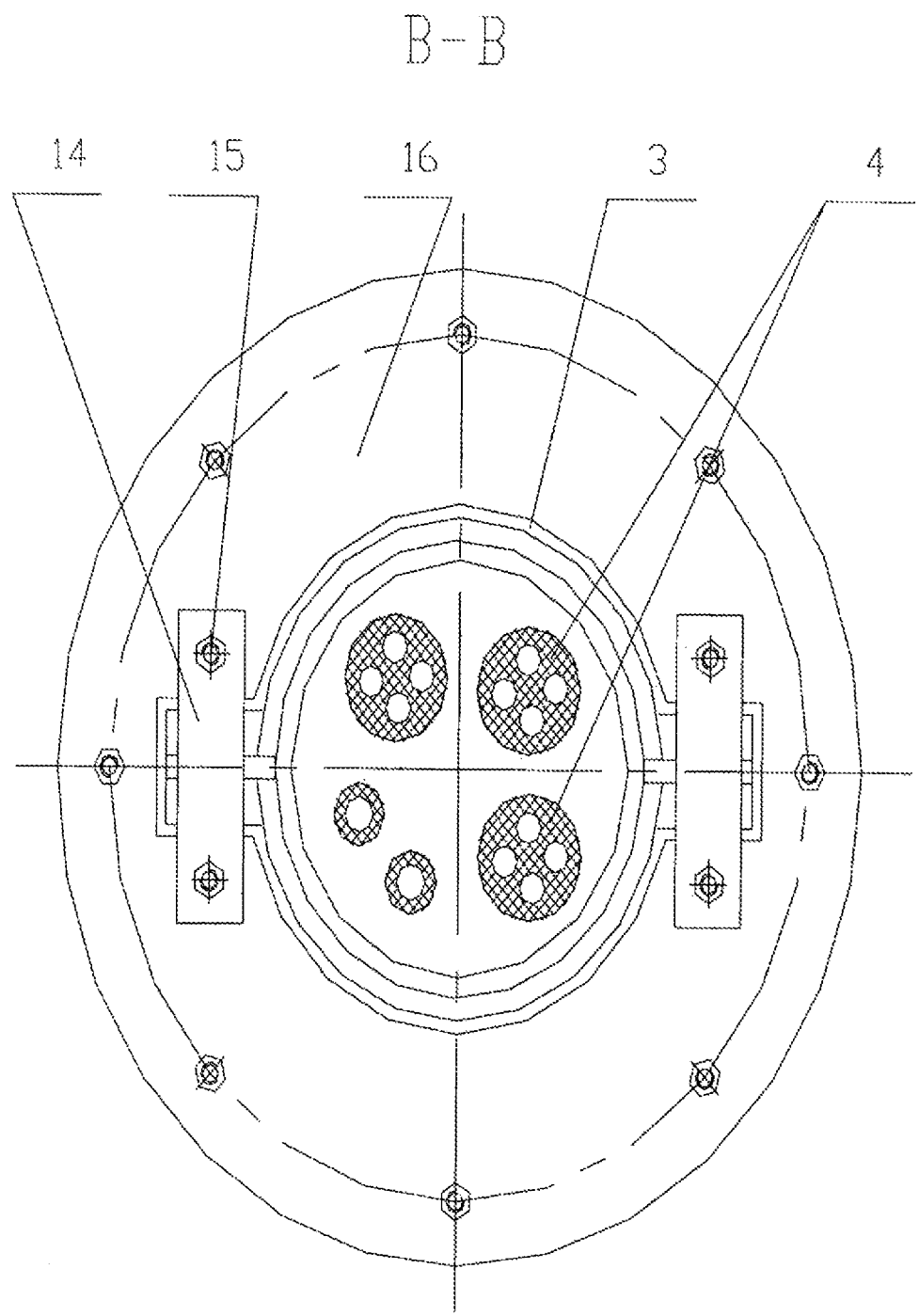
FIG. 5 is the section structural representation view along the direction B-B in FIG. 2.

As shown in FIG. 1, the cable wire outlet device of the submersible electrical pump in the prior art includes a wire outlet box 5' positioned in the wellbore 2', a cable protection pipe 3' and a cable 4'. Said wire outlet box 5' is connected to the top of the submersible electrical pump 7', and one end of said cable protection pipe 3' is connected to the top of the wire outlet box 5', and the other end is extended outside the well cover 1' of the wellbore 2'. Said cable 4' is positioned in the cable protection pipe 3' and connected with the submersible electrical pump 7' through the wire outlet box 5'. In such a cable wire outlet device, the end of the cable protection pipe is exposed outside, so that the rainwater will enter into the cable protection pipe from its top easily, thus bringing in the potential safe hazard.

As the structural representations shown in FIGS. 2-5, the dry-type cable wire outlet device of an submersible electrical pump according to the present utility model includes a wire outlet device 5 positioned in the wellbore 2, a cable protection pipe 3 and a cable 4. Said wire outlet box 5 is connected to the top of the submersible electrical pump 7, and one end of said cable protection pipe 3 is connected to the top of the wire outlet box 5 while the other end is extended outside the well cover 1 of the wellbore 2. Said cable 4 is positioned in the cable protection pipe 3 and connected with the submersible electrical pump 7 through the wire outlet box 5. The cable wire outlet device further includes a wire outlet sealing device, which is connected to the well cover 1. The end of the cable protection pipe 3 extended outside the well cover 1 is positioned in the wire outlet sealing device. Said wire outlet sealing device includes a sealing box 11 and a sealing assembly 12 of the wire outlet hole, and said sealing box 11 is connected to the well cover 1 with a sealing ring 10 therein. Said cable 4 passing through the connection of the sealing box 11 is sealed by means of the sealing assembly 12 of the wire outlet hole. In this embodiment, said sealing ring 10 is the O-type sealing ring sold commercially.

Said sealing assembly 12 of the wire outlet hole includes a cable sealing ring 121, a rubber sleeve 122 and a bell mouth 123 having an axial through groove. Said cable sealing ring 121 is embedded within the cable wire outlet hole 13 on the sealing box 11, said rubber sleeve 122 surrounds the cable 4, and said bell mouth surrounds the rubber sleeve 122. The bell mouth is fastened by means of the anchor ear and the bolt, and one end of the bell mouth 123 is tightly pressing against the cable sealing ring 121. In other words, an end of the bell mouth is fastened on the end face of the sealing box 11 by means of the screws, so that the cable sealing ring 121 is tightly pressed within the cable wire outlet hole 13 by the end face of the bell mouth 123.

A sealing washer 17 and a sealing platen 16 are provided in said wire outlet sealing device. Said sealing washer 17 is tightly fitted in with the cable protection pipe 3, and fixed on the well cover 1 by means of the sealing platen 18.

Said sealing platen 18 is provided with an anti-lift block 14 connected by bolts 15. An anti-chafe jacket 18 is muff-coupled at the opening of one end of said cable protection pipe 3, and the end is positioned in the wire outlet sealing device. Said cable protection pipe 3 is in Harvard-typed structure and connected by means of screws.

A drain hole 8 is provided on the side wall at the bottom of said wire outlet box 5, and a plug 9 is screwed at said drain hole 8.

A water-leakage alarm is provided within said wire outlet box 5 and fixed on the top of the submersible electrical pump 7. Said water-leakage alarm is the common water-leakage alarm which is commercially available.

The invention claimed is:

1. A dry-type cable wire outlet device of a submersible electrical pump, the outlet device comprising:
   a wire outlet box positioned in a wellbore with a well cover sealed at the top of the wellbore,
   a cable protection pipe;
   a cable positioned within the cable protection pipe and connected with the submersible electrical pump through the wire outlet box, and
   a wire outlet sealing device located at the outside of the wellbore,
   wherein:
   the wire outlet box is disposed directly on a top of the submersible electrical pump,
   one end of the cable protection pipe is connected to a top of the wire outlet box and the other end of the cable protection pipe is extended outside the well cover of the wellbore,
   the wire outlet sealing device is directly fixed on the well cover and seals the other end of the cable protection pipe,
   the wire outlet sealing device includes a sealing box and a wire outlet sealing assembly,
   the sealing box is directly fixed on the well cover, having a wire outlet hole, wherein a sealing ring is located between the sealing box and the well cover;
   the cable goes out of the sealing box through the wire outlet sealing assembly,
   the wire outlet sealing assembly comprising:
   a cable sealing ring,
   a rubber sleeve, and
   a bell mouth with an axial through groove,
   wherein the cable sealing ring is embedded in the wire outlet hole of the sealing box,
   the rubber sleeve surrounds the cable and the bell mouth surrounds the rubber sleeve,
   the bell mouth is fastened by an anchor ear and a bolt, and
   an end of the bell mouth is tightly pressed against the cable sealing ring,
   a sealing washer and a sealing platen located in the sealing box,
   wherein the sealing washer is tightly fitted in with the cable protection pine and fixed on the well cover by the sealing platen, and
   an auto-lift block located in the sealing box and attached on the too of the sealing platen by a bolt.

2. The dry-type cable wire outlet device as claimed in claim 1, further comprising:
   an anti-chafe jacket,
   wherein the end of the cable protection pipe positioned in the wire outlet sealing device is muff-coupled with the anti-chafe jacket from inside wall to outside wall.

3. The dry-type cable wire outlet device of as claimed in claim 1, wherein the cable protection pipe comprises two half tubes, the two half tubes are firmly screwed to form the cable protection pipe.

4. The dry-type cable wire outlet device of as claimed in claim 1, wherein
   a drain hole is provided on a side wall at a bottom of the wire outlet box, and
   a plug is screwed at the drain hole.

5. The dry-type cable wire outlet device as claimed in claim 1, further comprising:
   a water-leakage alarm provided within the wire outlet box and fixed on the top of the submersible electrical pump.

* * * * *